UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PROCESS OF PURIFYING NITROCELLULOSE.

SPECIFICATION forming part of Letters Patent No. 605,931, dated June 21, 1898.

Application filed October 9, 1897. Serial No. 654,688. (No specimens.)

*To all whom it may concern:*

Be it known that I, JOHN H. STEVENS, of the city of Newark, county of Essex, and State of New Jersey, have made a new and useful Improvement in the Purification of Nitrocellulose, of which the following is a specification.

Nitrocellulose or pyroxylin is made by dipping cotton or other cellulose into a mixture of nitric and sulfuric acids. The nitro elements combine with the cellulose to form nitrocellulose. The more highly nitrated cellulose and its compounds are used as explosive agents, and the products of lower nitration, on account of their ready solubility in certain spirituous or ethereal solvents—like alcohol, wood spirit, ether alcohol, &c.—are used to make varnishes or such compounds as "celluloid."

In making solutions or compounds of nitrocellulose the importance of having it as free as possible from impurities is well understood. The nature of the impurities is somewhat complex; but the result of having an impure nitrocellulose is acid decomposition or the formation of nitrous acid in the final mixtures or products. This is also accompanied by discoloration and loss of essential properties, such as strength.

Many methods have been proposed for purifying nitrocellulose. It has been boiled in aqueous solutions of alkaline salts and other chemicals, and it has been treated in the cold with numerous chemical substances dissolved in the wash-water. The physical structure has also been altered as a means for facilitating the removal of deleterious substances. All of these methods involve more or less delay and expense, and in many cases the staining or contamination of the pyroxylin with coloring-matters or specks of dirt, especially in those processes which require severe treatment in contact with wood or metal.

The effect of the impurities in nitrocellulose on the compounds made with it has been neutralized to some extent by introducing preservative agents into the final mixtures. Such a practice is illustrated in my application for a patent on the use of urea in transparent compounds. (Serial No. 529,603.) In that process I wash the pyroxylin as free as possible from adhering acids and remove the water by drying. To the dry pyroxylin I add the urea, dissolved in a liquid solvent of the nitrocellulose compound. This neutralizes the free acid present and takes up the nitrous decomposition products as fast as they are formed; but the impurities in the nitrocellulose still have some injurious effect upon the compound, such as discoloration, and the products resulting from the reaction of the urea with the acids present are in themselves more or less objectionable. The nitrate of urea, for instance, has a tendency to corrode metals.

I have discovered a very simple means of purifying pyroxylin, so that the tendency to form nitrous decomposition products is greatly lessened.

My new process consists in first washing the pyroxylin in several waters to free it as far as is ordinarily possible from the acid which adheres to it after it is taken from the nitrating vessels, and then I treat it with a very dilute aqueous solution of urea. This can be done in the washing-tanks or other apparatus employed for the same purpose. The urea is added to the final wash-water. After remaining in contact with this urea solution for several hours the pyroxylin is deprived of the water by any of the usual means, such as centrifugal machinery or presses or absorption by absorbing-pads or blotting-paper, as is well understood. This leaves the pyroxylin in a dry state and practically free from urea. If necessary, the urea can be added, preferably in aqueous solution, to the pyroxylin after the final wash-water has been drained off. This is best performed by grinding or thoroughly mixing the wet pyroxylin with the urea solution and then allowing it to stand a while, after which the solution can be removed by suitable means, such as heavy pressure or absorption.

I have found that the effect of treating the pyroxylin with urea in an aqueous solution is the production of a much purer pyroxylin with considerable less tendency to decomposition or discoloration. I find also that the usual antiacid substances employed with dry pyroxylin produce a better stability in the final products when they are used with my purified pyroxylin.

While I do not limit myself to any specific proportions of urea in the aqueous purification of the pyroxylin, I find that for practical purposes from two to ten pounds of urea are sufficient for each one thousand pounds of pyroxylin. The lowest proportion is to be used on a pyroxylin in which from its nature only a slight amount of impurities is present. The larger proportion is to be used with pyroxylin where considerable of the objectionable nitro elements exist. Outside of the question of expense there is no objection to using even larger proportions than those given.

The purifying operation can be carried on at any temperature; but I have obtained very satisfactory results at from 60° to 70° Fahrenheit.

I am aware that urea has been used in the manufacture of nitro compounds to prevent the formation of deleterious nitrous elements. I can instance the manufacture of nitric ethers. I am also aware that pyroxylin has been treated with alcoholic or acid solutions of urea in an endeavor to prevent the formation of unstable products. For instance, the acid-bath in which the pyroxylin is manufactured has contained urea. I am also aware, as before stated, that urea has been added to pyroxylin to make it more stable; but in such application the urea is necessarily added to the pyroxylin in spirituous solution after it has been washed and dried, because the urea is designed to form an essential part of the final product, whereas my present process is confined to the use of urea in aqueous solution during the manufacture of the pyroxylin, and after performing its work the urea is practically removed with the water, leaving the pyroxylin behind in a purified condition. In all these cases the office of the urea is distinct from the work it performs in my process, as my process relates solely to the purification of pyroxylin by treatment in aqueous solution.

The proof of the efficacy of my method is seen in the increased stability of my purified pyroxylin.

Having thus described my invention, what I claim, and desire to secure by Letters Patent, is—

1. The process for the purification of nitrocellulose which consists in subjecting the nitrocellulose to an aqueous solution of urea, substantially as described.

2. The process for purifying nitrocellulose which consists in washing the nitrocellulose with water and then subjecting it to an aqueous bath containing urea, substantially as described.

3. In the manufacture of a purified nitrocellulose, the process which consists of the following steps: (a) removing the acids by washing with water, (b) subjecting it to an aqueous bath containing urea, (c) drying the pyroxylin by removing the urea solution.

JOHN H. STEVENS.

Witnesses:
ABRAHAM MANNERS,
F. WM. RAWLE.